United States Patent
Harviainen

(10) Patent No.: US 11,024,092 B2
(45) Date of Patent: Jun. 1, 2021

(54) SYSTEM AND METHOD FOR AUGMENTED REALITY CONTENT DELIVERY IN PRE-CAPTURED ENVIRONMENTS

(71) Applicant: PCMS Holdings, Inc., Wilmington, DE (US)

(72) Inventor: Tatu V. J. Harviainen, Helsinki (FI)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 16/480,277

(22) PCT Filed: Jan. 25, 2018

(86) PCT No.: PCT/US2018/015264
§ 371 (c)(1),
(2) Date: Jul. 23, 2019

(87) PCT Pub. No.: WO2018/144315
PCT Pub. Date: Aug. 9, 2018

(65) Prior Publication Data
US 2019/0371073 A1    Dec. 5, 2019

Related U.S. Application Data

(60) Provisional application No. 62/453,317, filed on Feb. 1, 2017.

(51) Int. Cl.
*G06T 15/40* (2011.01)
*G06T 19/00* (2011.01)
*H04L 29/06* (2006.01)

(52) U.S. Cl.
CPC ............ *G06T 19/006* (2013.01); *G06T 15/40* (2013.01); *H04L 65/4084* (2013.01); *G06T 2200/16* (2013.01); *G06T 2210/08* (2013.01)

(58) Field of Classification Search
CPC .............................. G06T 15/40; G06T 19/006
See application file for complete search history.

(56) References Cited

U.S. PATENT DOCUMENTS

| 9,495,760 B2 | 11/2016 | Swaminathan |
| 2002/0080143 A1 | 6/2002 | Morgan |

(Continued)

FOREIGN PATENT DOCUMENTS

| CN | 104539925 B | 4/2015 |
| CN | 105931288 A | 9/2016 |

(Continued)

OTHER PUBLICATIONS

International Search Report and Written Opinion of the International Searching Authority for PCT/US2018/015264 dated Apr. 24, 2018.

(Continued)

*Primary Examiner* — Charles Tseng
(74) *Attorney, Agent, or Firm* — Invention Mine LLC

(57) ABSTRACT

This disclosure describes systems and methods for augmented reality (AR) content delivery in pre-captured environments. In one embodiment, an AR client gathers information about the physical environment with the help of sensors embedded within an AR headset. The client reconstructs a 3D model of the physical environment from the gathered information and sends it to an AR content server. Based on the 3D reconstruction information obtained at the AR content server, the server modifies the content. AR content server compares the AR content against the 3D reconstruction data and does a visibility analysis of the AR content. Based on the visibility analysis, the AR elements occluded by real objects are removed to reduce the data size of the AR content. Finally, the AR content server streams the (Continued)

modified content to the AR client and the AR client renders the content and sends it to the headset.

13 Claims, 9 Drawing Sheets

(56) References Cited

U.S. PATENT DOCUMENTS

| | | |
|---|---|---|
| 2006/0010454 A1 | 1/2006 | Napoli |
| 2012/0075433 A1 | 3/2012 | Tatzgern |
| 2012/0092328 A1* | 4/2012 | Flaks .................... G06F 3/012 345/419 |
| 2012/0224773 A1 | 9/2012 | Sweet, III |
| 2012/0327119 A1 | 12/2012 | Woo |
| 2014/0028715 A1* | 1/2014 | Fulks ................... G06T 19/006 345/633 |
| 2015/0262412 A1 | 9/2015 | Gruber |
| 2016/0104452 A1* | 4/2016 | Guan ................ G06F 3/04815 345/633 |
| 2016/0249039 A1* | 8/2016 | Tran ..................... G01S 7/4972 |
| 2016/0360104 A1 | 12/2016 | Zhang |
| 2017/0078447 A1 | 3/2017 | Hancock |
| 2018/0053352 A1* | 2/2018 | Finding .................... H04N 5/33 |

FOREIGN PATENT DOCUMENTS

| | | |
|---|---|---|
| EP | 2863336 A2 | 4/2015 |
| WO | 2012012161 A2 | 1/2012 |
| WO | 2015027105 A1 | 2/2015 |
| WO | 2015090420 A1 | 6/2015 |
| WO | 2015100490 A1 | 7/2015 |
| WO | 2018068236 A1 | 4/2018 |

OTHER PUBLICATIONS

Orts-Escolano, S., et. al, "Holoportation: Virtual 3D Teleportation in Real-Time". User Interface Software and Technology (UIST 2016), ACM, Oct. 16, 2016, pp. 741-754.
Imre, E., et. al., "Towards 3-D Scene Reconstruction from Broadcast Video". Signal Processing Image Communication, vol. 22, No. 2, Mar. 16, 2007, pp. 108-126.
Written Opinion of the International Preliminary Examining Authority for PCT/US2018/015264 dated Jan. 2, 2019, 10 pages.
International Preliminary Report on Patentability for PCT/US2018/015264 completed May 9, 2019, 17 pages.
Tao, M. et. al., et. al., "Depth from Combining Defocus and Correspondence Using Light-Field Cameras". Proceedings of the IEEE International Conference on Computer Vision, (2013), pp. 673-680.
Srinivasan, S., et al., "Performance Characterization and Optimization of Mobile Augmented Reality on Handheld Platforms". IEEE International Symposium on Workload Characterization (IISWC), (2009), pp. 128-137.
Qi, C., et. al. "Volumetric and Multi-View CNNS for Object Classification on 3D Data". Proceedings of the IEEE Conference on Computer Vision and Pattern Recognition, (2016), pp. 5648-5656.
Qi, C., et. al., "Pointnet: Deep Learning on Point Sets for 3d Classification and Segmentation". Proceedings of the IEEE Conference on Computer Vision and Pattern Recognition (CVPR), (2017), pp. 652-660.
McGuire, M. "Ambient Occlusion Volumes". High Performance Graphics, (2010), 10 pages.
Bacik, M. "Rendering the Great Outdoors: Fast Occlusion Culling for Outdoor Environments". Gamasutra: The Art and Business of Making Games, web article available at: https://www.gamasutra.com/view/feature/2979/rendering_the_great_outdoors_fast_.php?print=1, Dec. 10, 2018, pp. 1-5.
Batagelo, H., et. al., "Dynamic Scene Occlusion Culling Using a Regular Grid". Proceedings of Computer Graphics and Image Processing (SIBGRA, 2002), Feb. 2002, pp. 43-50.
Hayden, S. "FOVE Shows Glimpse of Foveated Rendering Progress". Road to VR, web article, available at: https://www.roadtovr.com/fove-shows-glimpse-foveated-rendering-progress/, Feb. 5, 2016.
Ozcinar, C., et. al., "Viewport-Aware Adaptive 360° Video Streaming Using Tiles for Virtual Reality". Arxiv Preprint, Nov. 7, 2017, 6 pages.
International Search Report and Written Opinion of the International Searching Authority for PCT/US2019/067898 dated Jun. 25, 2020, 17 pages.
Süß, Tim, et. al., "Approximative Occlusion Culling Using the Hull Tree". Graphics Interface Conference, May 25, 2011, pp. 79-86.
Andújar, Carlos, et. al., "Integrating Occlusion Culling and Levels of Detail through Hardly-Visible Sets". Computer Graphics Forum, vol. 19, No. 3, (2000), pp. 499-506.
Dachsbacher, Carsten, "Analyzing Visibility Configurations". IEEE Transactions on Visualization and Computer Graphics, vol. 17, No. 4, Apr. 2011, pp. 475-486.
Robles-Ortega, María Dolores, et. al., "Efficient Visibility Determination in Urban Scenes Considering Terrain Information". ACM Transactions on Spatial Algorithms and Systems (TSAS) vol. 3, No. 3, Sep. 2017, pp. 1-24.
Invitation to Pay Additional Fees, and Where Applicable Protest Fee for PCT/US2019/067898 dated Mar. 20, 2020, 14 pages.

* cited by examiner

SYSTEM AND METHOD FOR AUGMENTED
REALITY CONTENT DELIVERY IN
PRE-CAPTURED ENVIRONMENTS

CROSS-REFERENCE TO RELATED
APPLICATIONS

The present application is a national stage application under 35 U.S.C. 371 of International Application No. PCT/US2018/015264, entitled SYSTEM AND METHOD FOR AUGMENTED REALITY CONTENT DELIVERY IN PRE-CAPTURED ENVIRONMENTS, filed on Jan. 25, 2018, which claims benefit under 35 U.S.C. § 119(e) from U.S. Provisional Patent Application Ser. No. 62/453,317, filed Feb. 1, 2017, entitled "System and Method for Augmented Reality Content Delivery in Pre-Captured Environments", which is hereby incorporated by reference in its entirety.

BACKGROUND

Storing digital media in the cloud enables accessibility from anywhere in the world as long as a client has an internet connection. Digital media with greater levels of realism are encoded using high-resolution formats which demand large file sizes. Transporting this information (e.g., streaming the digital media to a client device) requires a proportionally large allocation of communication resources. Visually rich virtual reality (VR) content and augmented reality (AR) content both consume large amounts of data which is problematic for AR and VR content delivery. The limited bandwidth of the data connections between services delivering the content and clients consuming the content is a major bottleneck.

For example, spherical videos employed by cinematic VR technologies increase the video resolution requirements for on-line video feeds by a great deal. In cinematic VR, the transmitted video stream contains not only all the pixels seen on the screen, as is the case with a normal 2D video, but a full 360-degree field of pixels from a single view point. When cinematic VR content is consumed, only a small area of the whole video content is visible at any given point in time. This smaller cropped area of the full spherical view displayed on the client device needs to provide a full HD (i.e., 1080p) resolution for the viewing experience to match that offered by high resolution 2D video used today. When comparing monoscopic 360-degree spherical video to stereoscopic 360-degree 3D spherical video (in which separate image feeds are needed for separate eyes) the bandwidth required for content delivery becomes a major bottleneck. Next generation immersive content formats—that not only provide a full 360-degree stereoscopic view from a single viewpoint, but also allow a user to move within a limited area inside the content—will consume exponentially more information communication resources.

The ability to move within VR spaces is not the only driver behind these next generation format sizes, as the next generation of AR display technologies would preferably exhibit the same levels of spatial realism. Current content streaming methods used for delivering AR and VR experiences rely on traditional data transfer optimization techniques (e.g., spatial 2D image pixel compression and temporal motion compensation). The traditional techniques to data compression do not account for the nuances of AR use cases and may be improved.

SUMMARY

Systems and methods are described herein for selectively providing augmented reality (AR) information to an AR display client device. In some embodiments, bandwidth used to provide AR information to the client device may be reduced by selectively transmitting to the client device only those AR content elements whose appearance would not be obscured by physical objects in the AR viewing location.

For example, in one embodiment, a system (such as an AR content server) determines a location of an AR display device within an AR viewing environment. For at least a first element of AR content (such as a video or an AR object), the system selects a display location within the AR viewing environment. The system determines whether any physical object in the AR viewing environment is positioned along a line of sight between the AR display device and the display location of the first element. The system transmits the first element of AR content to the AR display device only in response to a determination that no physical object is along the line of sight. The system may process several elements of AR content with different display locations (including elements that may be in motion and thus have variable display locations) and may send to the AR display device only those elements with positions that are not obstructed by physical objects, from the perspective of the AR display device. In some embodiments, the AR element may be a portion of an AR object or video, such that unobscured portions of that object or video are sent to the client while obscured portions are not sent.

An exemplary method may be carried out by an AR headset according to an embodiment. The method includes obtaining a digitally reconstructed three-dimensional (3D) environment of an augmented reality (AR) viewing location, detecting an object in the digitally reconstructed 3D environment, determining a depth and a geometry of the object, sending a request for an augmented reality (AR) content stream to a server, the request including information indicating the depth and the geometry of the object, and receiving the AR content stream from the server, the AR content stream excluding AR content occluded by the object.

The method further includes, according to an embodiment, determining the AR viewing location using one or more of global positioning system (GPS) data, wireless data, and image recognition. In one embodiment, the digitally reconstructed 3D environment is obtained via one or more of a stored a previous AR session, a combination of stored data with data collected in real-time, or a point cloud of depth data.

In another embodiment, the digitally reconstructed 3D environment can be obtained via scanning the AR viewing location by inspecting it from several viewpoints.

In one embodiment, the method also includes tracking a point-of-view position and an orientation within the digitally reconstructed 3D environment.

In one embodiment, the information indicating the depth and the geometry of the object includes one or more of real-time raw sensor data, a depth map of the object, or an RGB-D data stream.

In one embodiment, the type of AR content requested is immersive video, and the information indicating the depth and the geometry of the at least one real-world object is formatted as a spherical depth map of the real-world AR viewing location.

Another embodiment is directed to an augmented reality (AR) content server including a processor, a communication interface, and data storage. In the embodiment, the AR content server is configured to receive a request for AR content via the communication interface, obtain, from the data storage, the requested AR content, obtain a digitally reconstructed three-dimensional (3D) environment of an AR viewing location, receive via the communication interface a point-of-view position and orientation from within AR viewing location, perform a visibility analysis via a comparison of the requested AR content with the digitally reconstructed 3D environment and the point-of-view position and orientation, and modify the requested AR content by removing data associated with one or more objects not visible from the point-of-view position and orientation according to the visibility analysis.

According to one embodiment, the digitally reconstructed 3D environment can be obtained from one or more of the data storage, an augmented reality (AR client), or a combination of the data storage and the AR client.

In another embodiment, or in a same embodiment, the modification of the requested AR content can be a function of a content type of the requested AR content, wherein the content type includes one or more of a three-dimensional (3D) scene, a light field, or immersive video with depth data.

Additionally, in one or more embodiments, the modified requested AR content can include an insert of previously removed three-dimensional (3D) objects within the requested AR content based on an updated point-of-view position and orientation.

In one embodiment, the visibility analysis includes identifying where the digitally reconstructed 3D environment has smaller depth values than the depth data associated with the requested AR content.

Another embodiment is directed to a method including receiving a request for an augmented reality (AR) content video stream, obtaining, from a data storage, the requested AR content video stream, obtaining a digitally reconstructed 3D environment of a real-world AR viewing location, receiving a point-of-view position and orientation from an AR client in the real-world AR viewing location, analyzing the digitally reconstructed 3D environment and the point-of-view position and orientation to determine whether the requested AR content video stream includes one or more objects occluded in the digitally reconstructed 3D environment, and removing the one or more objects that are occluded in the digitally reconstructed 3D environment.

In one embodiment, the method includes sending the modified AR content video stream to an AR display device.

In one embodiment, the analyzing the digitally reconstructed 3D environment and the point-of-view position and orientation includes determining a location of the AR display device, identifying one or more physical objects in the digitally reconstructed 3D environment as along a line of sight determined from the point-of-view position and orientation of the AR display device, and determining whether the one or more objects in the AR content video stream are occluded by the one or more physical objects based on the line of sight.

In one embodiment, the analyzing the digitally reconstructed 3D environment and the point-of-view position and orientation includes comparing depth values of the digitally reconstructed 3D environment with depth values of in the AR content video stream, and discarding portions of the AR content video stream with larger depth values than the corresponding depth values in the digitally reconstructed 3D environment to compensate for occlusions caused by one or more dynamic objects and/or static objects missing from the digitally reconstructed 3D environment.

In one variation of embodiments herein, the client is aware of the content type that it is requesting from the server and based on that, can provide environmental information in as compact format as possible. For example, for immersive video, the client could instead of sending the whole environment model, just send spherical depth map of the environment rendered from the viewpoint used at the moment.

In one variation of embodiments herein, the AR client device does not perform point-of-view and orientation tracking, but instead an external outside-looking-in tracking solution is employed. In a first further variation, the AR client device receives tracking information first from the external tracking solution, transforms it into the same coordinate system as is used in the 3D reconstruction, and then sends it to the content server. In a second further variation, the external tracking solution transforms the point-of-view and orientation into the same coordinate system as is used in the 3D reconstruction, and then sends it to the content server. In a third further variation, the AR content server receives tracking information from the external tracking solution and the server transforms it into the same coordinate system as is used in the 3D reconstruction.

In one variation of embodiments herein, the AR content server produces depth information for light fields once light field data has been uploaded to the server. During run-time, when a request for light field content is received by the AR content server, the content can be modified more efficiently by using the depth information already produced earlier (removing the need to perform the depth detection during content delivery).

Any of the embodiments, variations, and permutations described in the ensuing paragraphs and anywhere else in this disclosure can be implemented with respect to any embodiments, including with respect to any method embodiments and with respect to any system embodiments.

The disclosed systems and methods can reduce amounts of data required to be transmitted between an AR content service and a viewing client device significantly in many on-line AR content delivery use cases. The reduction is based on the physical characteristics of the environment wherein the client is consuming the content, and can be performed on a per client basis. This solution can be combined with other traditional data compression methods, thus providing further content delivery optimization without compromising the benefits achievable with traditional content delivery compression techniques.

BRIEF DESCRIPTION OF THE DRAWINGS

The accompanying figures, where like reference numerals refer to identical or functionally similar elements throughout the separate views, together with the detailed description below, are incorporated in and form part of the specification and serve to further illustrate embodiments of concepts that include the claimed invention and to explain various principles and advantages of those embodiments.

Figure 1:
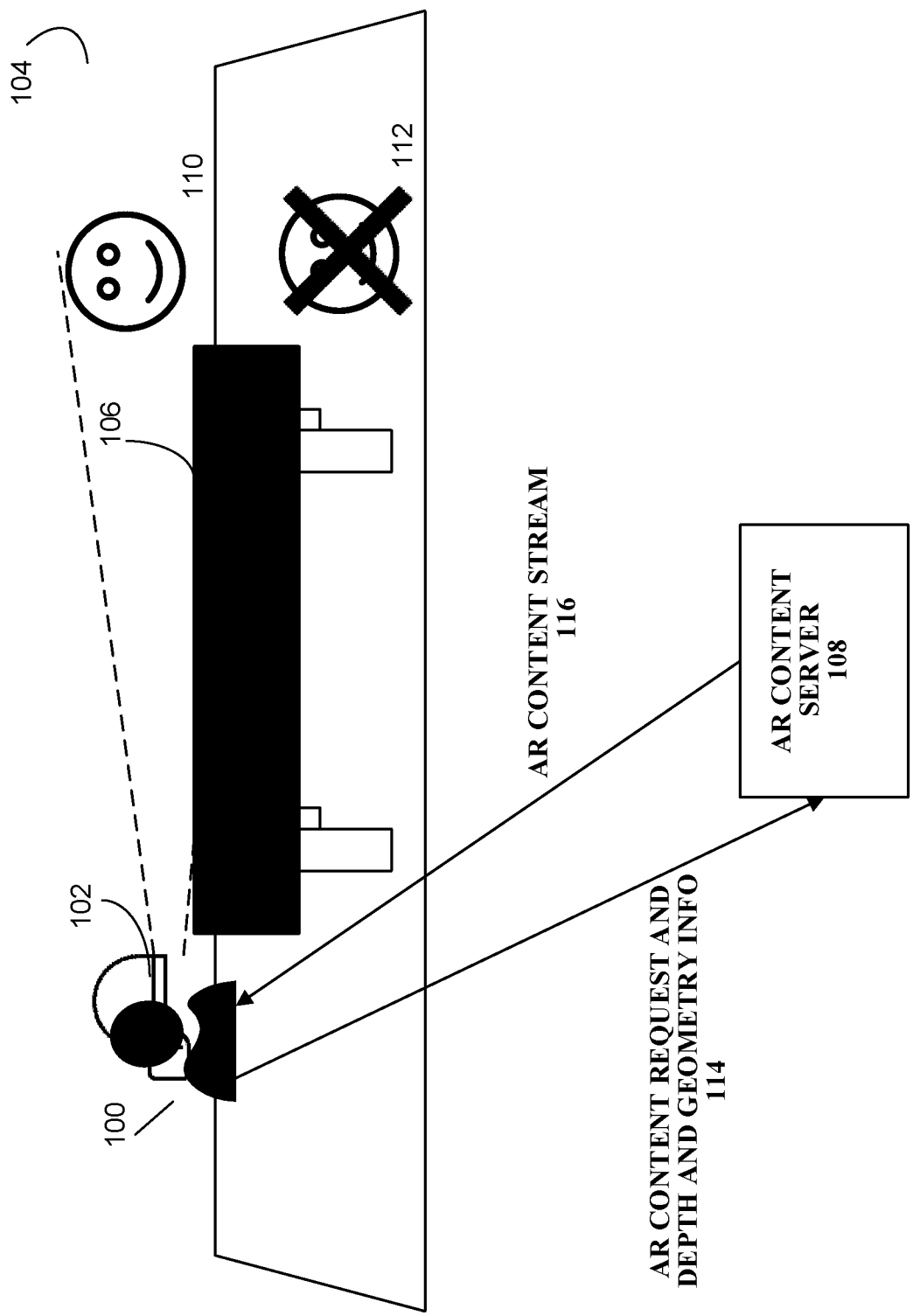
FIG. 1 is a visual overview of a method for AR content delivery in pre-captured environments, in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ."

Disclosed herein are methods and systems for augmented reality content delivery in pre-captured environments. This disclosure relates to content data transfer between an augmented reality (AR) content server and an AR client (e.g., an AR client running on an AR device, such as an optical see-through AR headset or a video see-through AR headset). Exemplary methods described herein make use of client devices providing information to the AR content server about the environment in which the augmented content is to be displayed. The AR content server adjusts AR content delivery based on the environmental characteristics of each individual client so that redundant data, which would not be visible to a specific client, is removed from the content stream transmitted a client.

In an exemplary embodiment, at the beginning of an AR session, the AR client device reconstructs a digital model of the present 3D environment. The generation of the model may employ previously-collected data corresponding to the same location. In other cases, the model is made by scanning the environment with sensors (such as RGB-D or other depth sensors) built into the AR client device. Combinations of previously collected data and presently collected data may be utilized to improve the accuracy of the model. A copy of the model is then sent to the content server, so that the server has instantaneous access to a digital version of the present 3D environment. The server copy of the model may be updated and improved at any time by incorporating more sensor data from sensing client devices. The model is used in the execution of virtual object visibility analyses. Collected environment data is also used by the client device to assist in location and orientation tracking (pose tracking). The pose (point-of-view position and orientation) of the device is used for synching the translations of the augmented elements displayed by the AR client with a users head movements. The pose information is sent to the server or calculated by the server using the environment model or other data to allow the server to estimate visibilities of elements of AR content from the user's viewpoint. From a user's point of view, real world objects such as tables, buildings, trees, doors, and walls can occlude AR content. This will happen whenever the depth of the AR content is farther away from the user than the real-world object but also in the same line of sight. True AR content containing high-resolution depth information allows for an enhanced sense of realism.

In one embodiment, the AR device used for viewing the AR content is equipped with sensors capable of producing depth information from the environment. A sensor, or combination of sensors, may include one or more sensors such as RGB-D cameras, stereo cameras, infrared cameras, lidar, radar, sonar, and any other sort of sensor known by those with skill in the art of depth sensing. In some embodiments, combinations of sensor types and enhanced processing methods are employed for depth detection. When the viewing session is initialized by the user, the viewing client reconstructs the environment model by collecting depth data from the environment.

During the reconstruction process executed on the client device, sensors collect point-cloud data from the environment as the user moves the device and sensors through the environment. Sensor observations with varying points of view are combined to form a coherent 3D reconstruction of the complete environment. Once the 3D reconstruction reaches a threshold level of completeness, the AR client proceeds to send the reconstructed model to the AR content server along with a request for a specific AR content. In exemplary embodiments, the level of completeness of the 3D reconstruction may be measured for example as the percentage of the surrounding area coverage, number of discrete observations, duration of sensing, etc. and any similar quality value that can be used as a threshold. 3D reconstruction of the environment may be carried out with any known reconstruction method, such as ones featured in KinectFusion™ or Point Cloud Library (PCL).

In one variation of the process, the client at the beginning of an AR viewing session starts to continuously stream RGB-D data to the server. The AR client then sends a content request. In this variation, the AR content server performs the 3D reconstruction process using the received RGB-D data stream and stores the reconstructed environment model. As the server constructs the per-client environment model, it also begins to modify the AR content by removing virtual elements that are occluded by the present environment. As the 3D reconstruction becomes more complete, the content removal processing becomes more accurate.

A user operating an AR client device may initiate the request for the AR session. The request is sent to the AR content server and indicates the specific content to user has selected. The AR content to be displayed may be defined as a weblink to the AR content server and reference to the specific AR content held within. Initializing an AR client may be handled automatically by an operating system based on the detection of the link type activated by the user. The client may be embedded within an application used to receive the content links, such as web browsers and mobile messaging applications. Once the user starts the AR session, the 3D reconstruction of the environment described previously is initialized.

After the reconstruction process, the client starts a pose tracking process. The objective of the pose tracking process is to estimate where the client device is and in which direction the client device is facing relative to the previously reconstructed environment. Pose tracking can be done using any known tracking technique and can be assisted using the reconstructed environment model and client device sensor data. In some embodiments, once the client device pose has been determined, the client sends the reconstructed environment model to the AR content server along with the determined pose and a request for specific AR content.

The AR content server receives the AR content request from the AR client and fetches the requested content from a content storage. The AR content server then modifies the requested AR content to remove redundant data. Content delivery optimization, in this case, refers to the process executed by the AR content server. During content delivery optimization parts of the requested AR content that would be rendered at positions that are not visible to the viewer are removed from the content. In AR, virtual elements of the AR content are preferably perceived as being a part of (or fusing with) the real world seen by the viewer. To enhance that perception of realism, embodiments disclosed herein replicate the appearance of physical objects blocking users' views to the virtual objects. By removing all the elements from the content that are occluded by real world elements, the size of the content can be reduced without causing any loss of quality that users would be able to observe. Depending on the requested content type, the AR content server uses slightly different content delivery optimization processes. In fact, even the client device may take advantage of further improvements based on the type of AR content it is requesting. Different approaches for optimizing light fields, immersive videos, and synthetic 3D scenes are described in the ensuing sections.

Light field data can include an array of sub-images captured concurrently at a scene from several different viewpoints. Based on the array of sub-images, new viewpoints between original viewpoints can be generated computationally. The array of sub-images may also be processed to enable refocusing of the compiled final images. Most relevantly, the array of sub-images may be used to extract depth information corresponding to the captured scene e.g., via an analysis of the parallax and disparity maps of the sub-images.

For light field optimization, the AR content server extracts depth information from the light field and aligns a light field depth map with the environment model received from the AR client. For each sub-image of the light field, the AR server transforms viewpoints of the combined light field depth map and the client environment model to match the viewpoint of the light field sub-image. For each pixel of the light field sub-image, the AR content server compares depth values from client's environment model to corresponding depth values extracted from the light field data. If the depth map of the light field has greater depth values than those from the client environment model, corresponding pixels in the light field sub-image are discarded as they are occluded by real-world objects and thus will not be visible to the client.

With immersive video, for which there is associated depth information available, optimization may be performed by comparing depth values of the immersive video to depth values of the environment relative to the tracked camera pose. For any content removal, the AR content server operates to re-render the video. During re-rendering, parts of the video data occluded by the real-world elements in the user's environment are discarded. These large discarded areas can be efficiently compressed with traditional video compression methods.

Synthetic 3D scenes, which include virtual 3D information, are optimized in some embodiments by executing visibility detection on the virtual 3D elements in view of the geometry captured from the real-world viewing environment. In the visibility detection, the visibility of the content from the users viewpoint is determined. Visibility detection can be executed per object or per each vertex of each object, depending on the geometric representation of the virtual AR element. In some embodiments, an object-level removal (as opposed to vertex-level removal) is performed where removing part of the object's geometry would cause the need for significant object data reorganization. This would stop a 3D rendering algorithm from using buffer objects for storing parts of the content as static entities in the GPU's memory. The modified AR content is sent to the AR client upon completion of the relevant content delivery optimization.

The AR client receives the modified AR content from the AR content server and displays it to the viewer. For displaying the content, the AR client determines device pose from the client device depth sensors. Based on the orientation information, a display process aligns a received content coordinate system with that of the user. After aligning the content, in some embodiments, a sub-process compares depth values received from the client device sensors with the depth values of the modified content received from the AR content server. Areas of the content that have larger depth values than the corresponding depth values in the client device depth sensor data can be discarded and not be rendered, as they would otherwise be rendered at a spatial position that is occluded by real physical elements in the environment. The AR content server has already removed the AR content elements occluded by elements present in the environment model sent by the client to the server, but this run-time depth comparison handles occlusion caused by dynamic elements and static elements missing from the environment model sent to the content server.

FIG. 1 is a visual overview of a method for AR content delivery in pre-captured environments, in accordance with at least one embodiment. Depicted in the visual overview is a user 100 wearing an AR headset client device 102. User 100 is in a real-world AR viewing location 104 that includes a large table 106. Client device within 102 begins to reconstruct the present environment via data collection cameras and sensors within the AR headset client device 102. Client 102 collects data about the shape and position of the table using the cameras and sensors in the AR headset and sends this data to an AR content server 108.

User 100 wishes to consume AR content depicting two virtual characters 110 and 112. The AR client sends a content request 114 to the AR content server 108. AR content server 108 performs a visibility analysis of the selected content. AR content server 108 concludes that, based on the users position and orientation with respect to the present environment, a top virtual character is visible 110 and a bottom virtual character 112 will be occluded by table 106.

The AR content server 108 then modifies the AR content by removing the bottom virtual character. Standard compression techniques may be employed to reduce the size of the modified frames. The modified content stream is then sent from the server to the user 100 for consumption.

One embodiment includes a process carried out by an AR headset client device 102. The process includes generating a digitally reconstructed 3D environment of a real-world AR viewing location using an AR client device 102. The process includes detecting an object in the digitally reconstructed 3D environment. The process also includes determining a depth and geometry of the object. The process also includes sending information indicating the depth and geometry of the object to an AR content server 108. The process also includes sending a request for AR content from the AR client to the AR content server 108. The process also includes receiving, at the AR client device 102, an AR content stream 116 from the AR content server 108, wherein the received AR content stream 108 has been filtered by the AR content server 108 to exclude AR content that would be occluded by the object 112.

Figure 2:
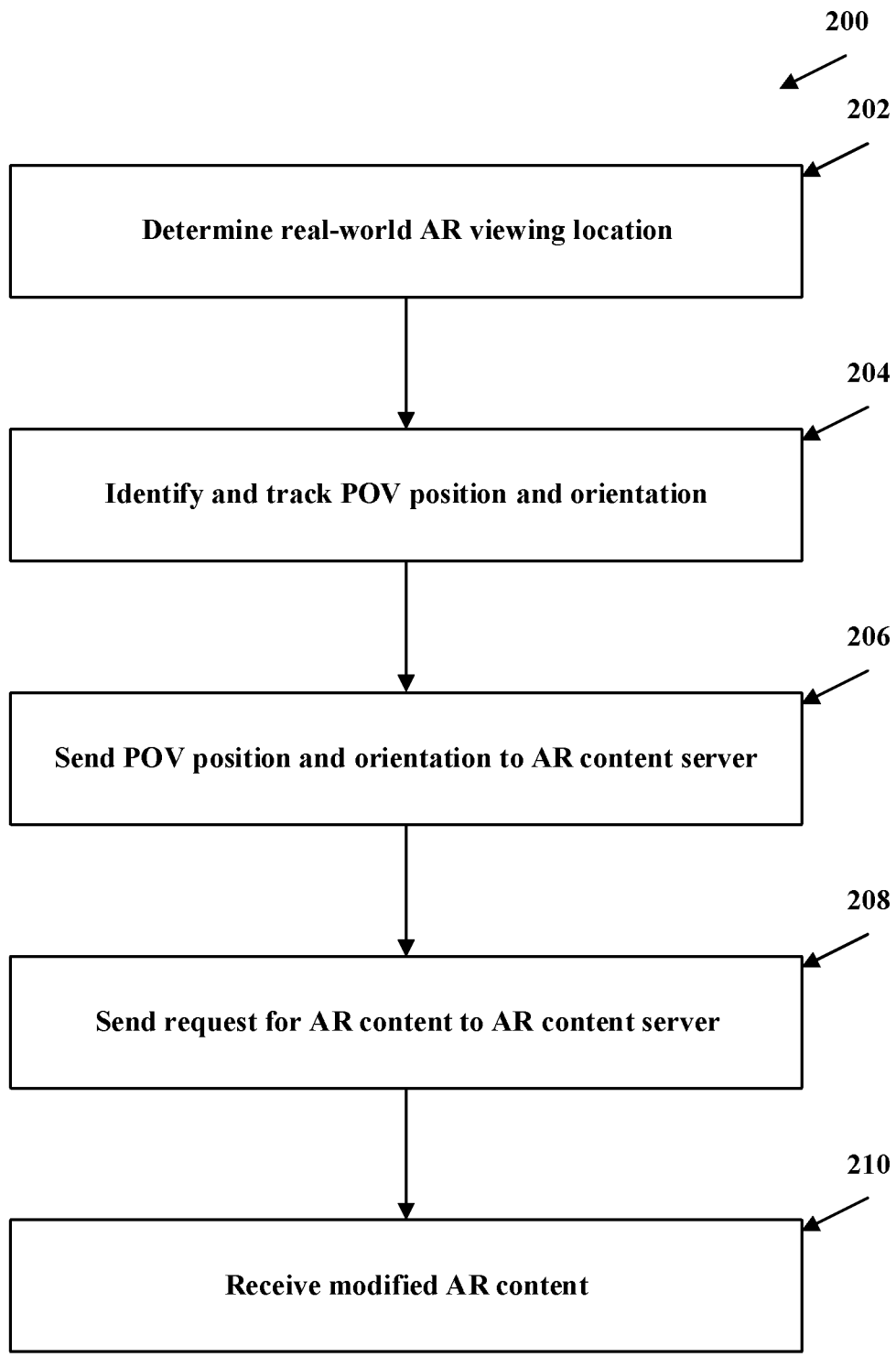
FIG. 2 is a flow chart of a method, carried out by an AR client, for AR content delivery in pre-captured environments, in accordance with at least one embodiment.

FIG. 2 is a flow chart of a method, carried out by an AR client, for AR content delivery in pre-captured environments, in accordance with at least one embodiment. FIG. 2 depicts a process 200, including elements 202-210. At element 202 an AR client, such as client 102 determines a real-world AR viewing location. At element 204 the process 200 includes identifying and tracking a point-of-view position and orientation of an AR client, such as client 102 within the real-world AR viewing location 104. At element 206 the process 200 includes sending information indicating the point-of-view position and orientation to an AR content server 108. At element 208 the process 200 includes sending a request for AR content to the AR content server 108. At element 210 the process 200 includes receiving, at the AR client device 102, an AR content stream, such as stream 116, from the AR content server, wherein the received AR content stream, such as stream 116, has been filtered by the AR content server, such as server 108, to exclude AR content that is not visible in the real-world AR viewing location from the point-of-view position and orientation.

Figure 3:
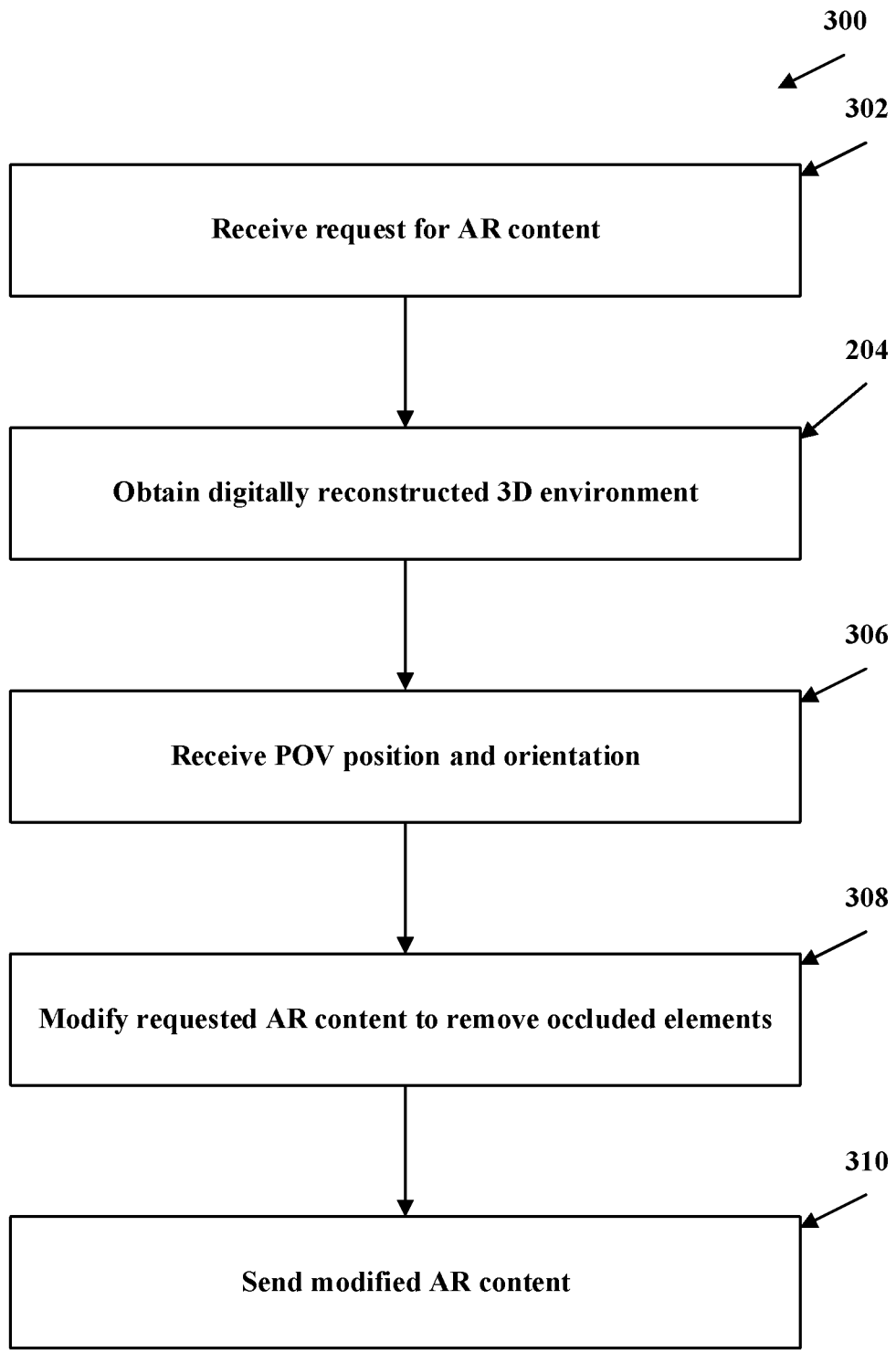
FIG. 3 is a flow chart of a method, carried out by an AR content server, for AR content delivery in pre-captured environments, in accordance with at least one embodiment.

FIG. 3 is a flow chart of a method carried out by an AR content server for AR content delivery in pre-captured environments, in accordance with at least one embodiment. FIG. 3 depicts a process 300, including elements 302-310. At element 302 an AR content server, such as server 108, receives a request for AR content from an AR client such as client device 102. At element 304 the process 300 includes obtaining a digitally reconstructed 3D environment of a real-world AR viewing location, such as location 104. At element 306 the process 300 includes receiving a point-of-view position and orientation from an AR client in the real-world AR viewing location. At element 308 the process 300 includes comparing the requested AR content with the digitally reconstructed 3D environment and the point-of-view position and orientation to perform a visibility analysis on the requested AR content and modifying the requested AR content by removing parts not visible from the point-of-view position and orientation, as indicated by the visibility analysis. At element 310 the process 300 includes fulfilling the request for AR content by sending the modified AR content to the AR client.

In at least one embodiment, obtaining the digitally reconstructed 3D environment of the real-world AR viewing location includes obtaining the reconstructed 3D environment from data storage. In at least one embodiment, obtaining the digitally reconstructed 3D environment of the real-world AR viewing location includes obtaining the reconstructed 3D environment from the AR client. In at least one embodiment, obtaining the digitally reconstructed 3D environment of the real-world AR viewing location includes generating the reconstructed 3D environment using data from data storage and real-time data from the AR client device.

In at least one embodiment of the AR content server, modifying the requested AR content varies depending on the content type. In one such embodiment, the content type is a 3D scene and modifying the requested AR content includes (i) removing occluded 3D objects from the requested AR content, (ii) obtaining an update to the point-of-view position and orientation, and (iii) based on the updated point-of-view position and orientation, sending AR objects to the AR client that were earlier removed but are now visible. In another such embodiment, the content type is a light field and modifying the requested AR content includes (i) processing the light field content frame by frame to remove occluded parts, and (ii) re-packaging the remaining data for streaming. In yet another such embodiment, the content type is immersive video with depth data, and modifying the requested AR content and includes (i) removing parts of the video in which the digitally reconstructed 3D environment has smaller depth values than the depth data associated with the video, (ii) re-rendering frames, and (iii) re-package the video for streaming.

Figure 4:
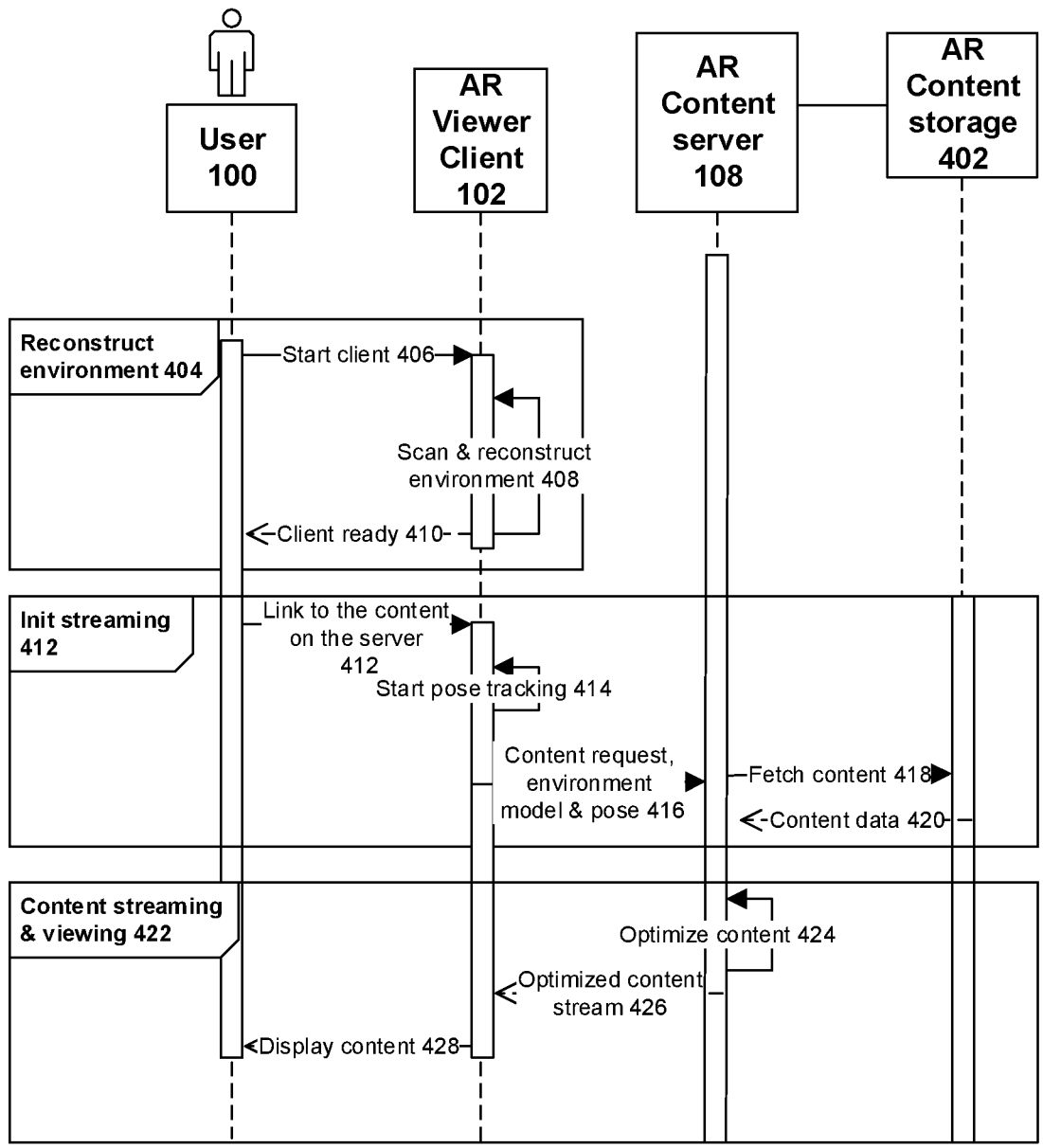
FIG. 4 is a sequence diagram of a method for AR content delivery in pre-captured environments, in accordance with at least one embodiment.

FIG. 4 is a sequence diagram of a method for AR content delivery in pre-captured environments, in accordance with at least one embodiment. For use as a further resource, the following paragraphs will contain an example traversal of the sequence diagram of FIG. 4.

A client device 102 reconstructs the present AR viewing location at Reconstruct environment 404. User 100 starts an AR viewing client 102 at step 406 and scans the present environment 408 with an AR headset, which can be coupled to the viewing client directly or wirelessly. The client device 102 may alternatively identify the present AR viewing location and send this information to an AR content server 108 that already has an environment model. Scanning and reconstructing the environment is useful for tracking purposes as well. In FIG. 4, when the digital reconstruction is complete, the user 100 is notified at step 410 "client ready".

Then user 100 can initiate an AR content streaming (viewing) session as shown at step 412. The user 100 enters or selects a link for AR content 414 and gives this to the AR client 102. Upon reception of the link, the AR client conducts pose tracking 414 (though this step may be initialized at an earlier time). The AR client sends a content request 416 for the digitally reconstructed 3D environment, and the current AR client pose to an AR content server 108.

The AR content server 108 obtains, at fetch content 418, the requested AR content at step 420 from an AR content storage 402.

Content streaming and viewing 422 may commence after retrieval. The AR content server 108 optimizes the requested AR content 424 by removing elements that are occluded by the real-world environment. This may involve modifying frames of content, re-rendering the modified frames, etc. The AR content server 108 performs a visibility analysis (which the AR client could do as well) to determine what AR content would not be visible to user 100 using the digitally reconstructed 3D environment and the client pose. The optimized content 424 is then provided via optimized content stream 426 to AR viewer client 102 so that user 100 can see the displayed content 428.

At least one embodiment includes a process for digitally reconstructing an augmented reality (AR) viewing location using an AR client. The process also includes sending information describing the digitally reconstructed AR viewing location from the AR client to an AR content server. The process also includes sending a request for AR content from the AR client to the AR content server. The process also includes sending information describing a position and orientation of the AR client within the AR viewing location from the AR client to the AR content server. The process also includes determining, at the AR content server, a visibility of a requested AR content based on the received information describing the digitally reconstructed AR viewing location and the received information describing the position and orientation of the AR client. The process also includes modifying, at the AR content server, the requested AR content by removing parts of the requested AR content that are determined to be not visible. The process also includes sending the modified AR content from the AR content server to the AR client. The process also includes augmenting the AR viewing location with the modified AR content using the AR client.

Figure 5:
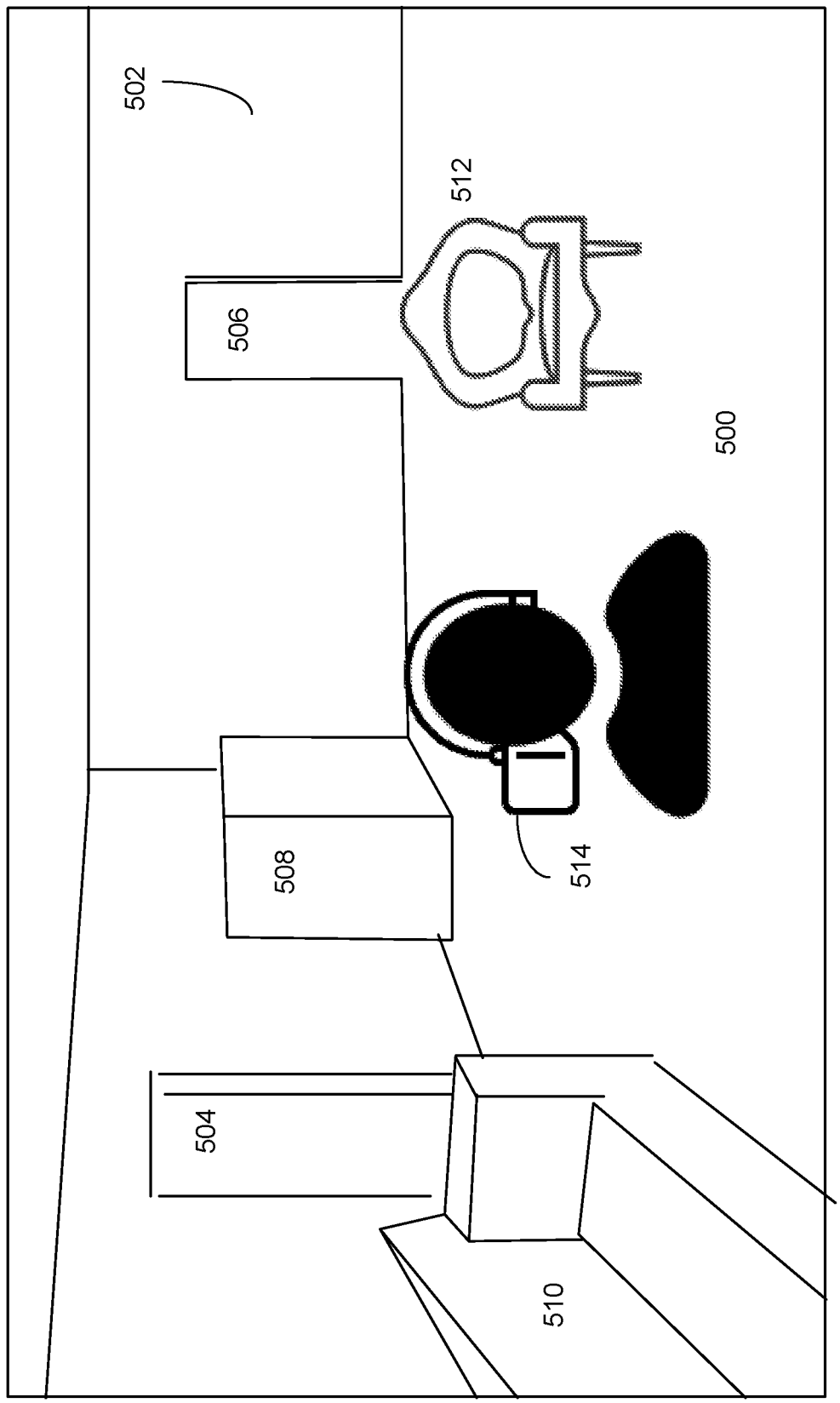
FIG. 5 is a schematic perspective view of a user in an example real-world AR viewing location, in accordance with at least one embodiment.

FIG. 5 is a depiction of a user 500 and an example real-world AR viewing location 502, in accordance with at least one embodiment. FIG. 5 is a reference image that is used to aid the descriptions of FIGS. 6-10. FIG. 5 depicts user 500 in the example real-world AR viewing location. The viewing location 502 is a room that contains two open doorways, 504 and 506, a dresser 508, a couch 510, and a chair 512. User 500 scans the real-world AR viewing location with an AR headset 514.

Figure 6:
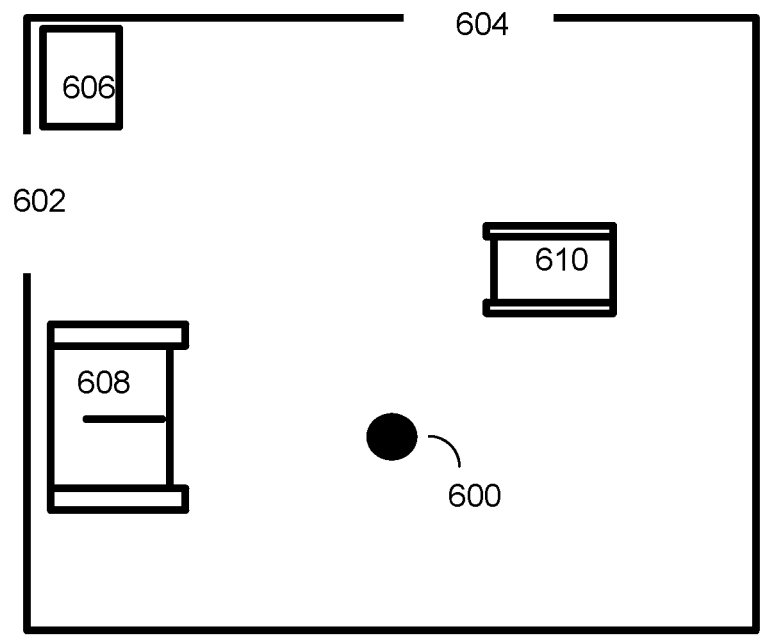
FIG. 6 is a plan view of a digitally reconstructed 3D environment, in accordance with at least one embodiment.

FIG. 6 is a plan view of a digitally reconstructed 3D environment, in accordance with at least one embodiment. The user 600 scans the AR viewing location using an AR client and generates a digitally reconstructed 3D environment. The digital reconstruction includes the two open doorways, 602 and 604, the dresser 606, the couch 608, and the chair 610. FIG. 2 is a plan view of that reconstruction. The AR headset worn by user 600 determines its pose and sends the pose and the digital reconstruction to an AR content server 108.

Figure 7:
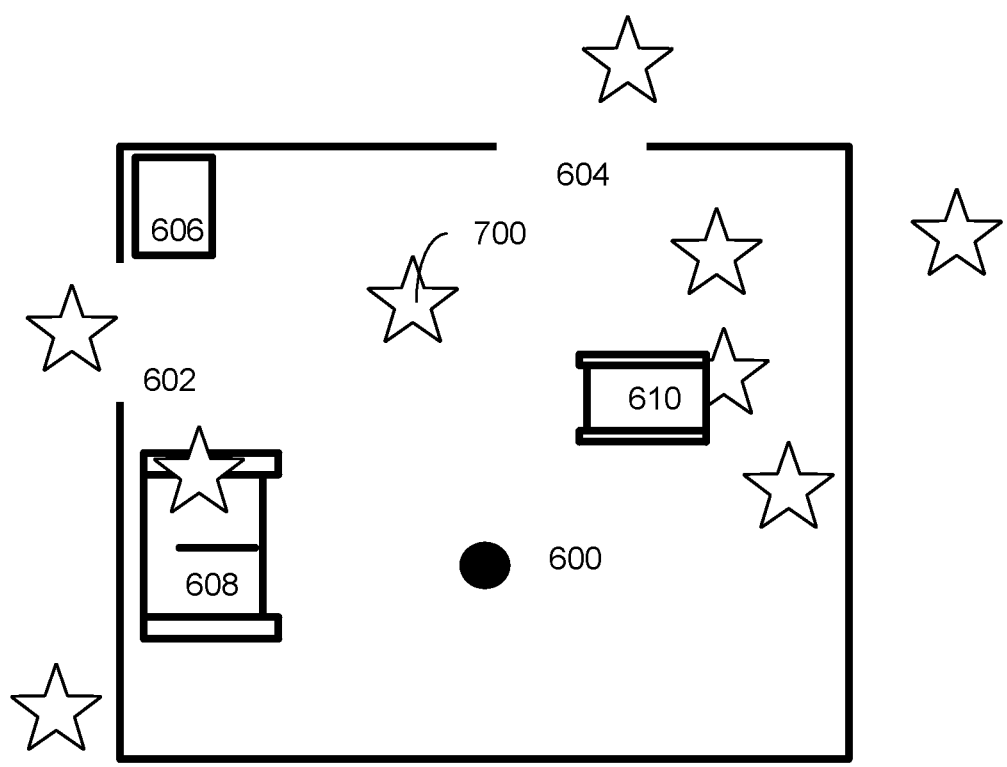
FIG. 7 is a plan view of a requested AR content and the digitally reconstructed 3D environment of FIG. 6, in accordance with at least one embodiment.

FIG. 7 is a depiction of a requested AR content and the digitally reconstructed 3D environment of FIG. 6, in accordance with at least one embodiment. The user 600 has requested AR content that depicts nine stars 700 (e.g. in an AR planetarium application). A coordinate system of the AR content is aligned with the real-world viewing location using the digitally reconstructed 3D environment and the pose information. The alignment may be performed in various ways. For example, the alignment may be selected so as to minimize the amount of AR content (e.g. the number of stars) that would not be displayed due to obstructions. The alignment may be selected with user input, e.g. the alignment may be adjusted by the user until a preferred alignment is selected. The alignment may be selected based on other inputs, for example one or more accelerometers in the AR display device may be used to ensure that an "up" direction with respect to the AR content is aligned with the "up" direction in the AR viewing environment. In some embodiments, an alignment may be selected such that the direction a user is facing at the start of an AR session may be aligned with a preferred viewing direction of the AR content.

Based on the selected alignment, a display location of each element of AR content (e.g. a display location of each star) may be determined by transforming coordinates of those elements from the coordinate system of the AR content to the coordinate system of the 3D viewing environment using the selected alignment.

Figure 8:
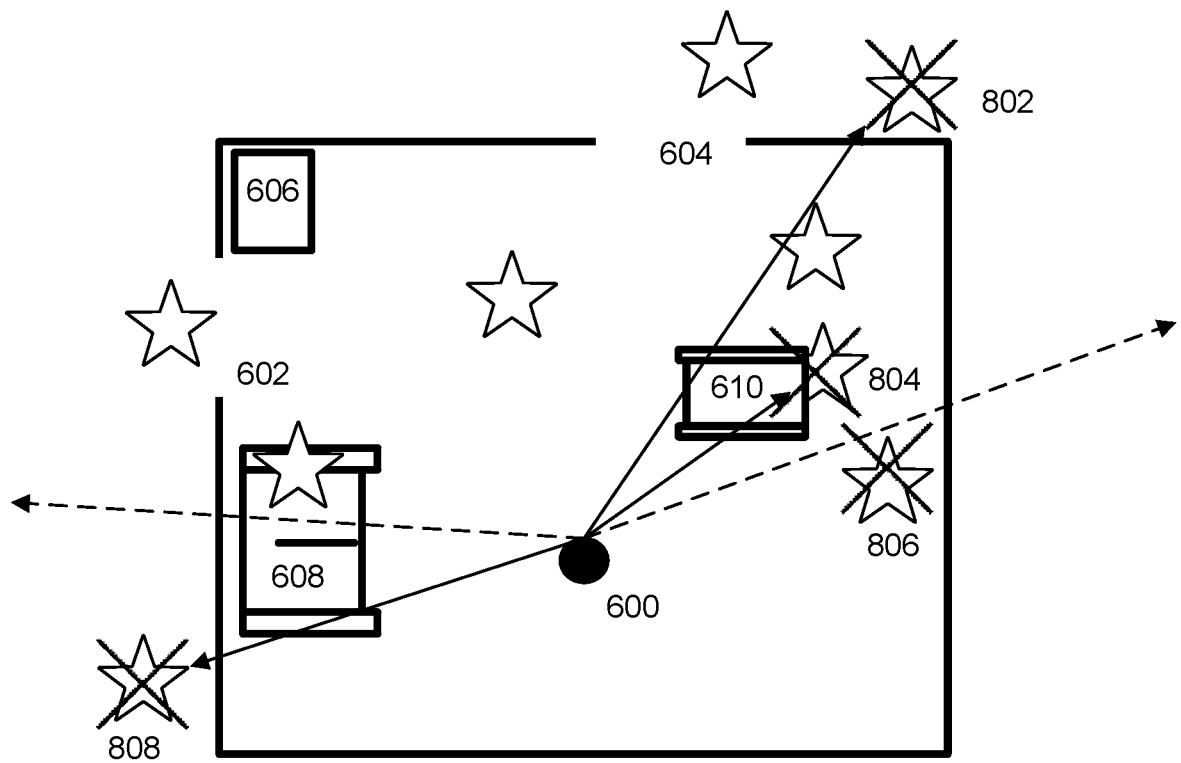
FIG. 8 is a plan view schematically illustrating a visibility analysis performed on the requested AR content of FIG. 7, in accordance with at least one embodiment.

FIG. 8 is a depiction of a visibility analysis performed on the requested AR content of FIG. 7, in accordance with at least one embodiment. The AR content server 108 performs a visibility analysis using the digitally reconstructed 3D environment and the pose information. The AR content server 108 determines that four of the stars, 802, 804, 806 and 808 included in the original AR content would not be visible from the point of view of the user 600 and removes them from the content.

Figure 9:
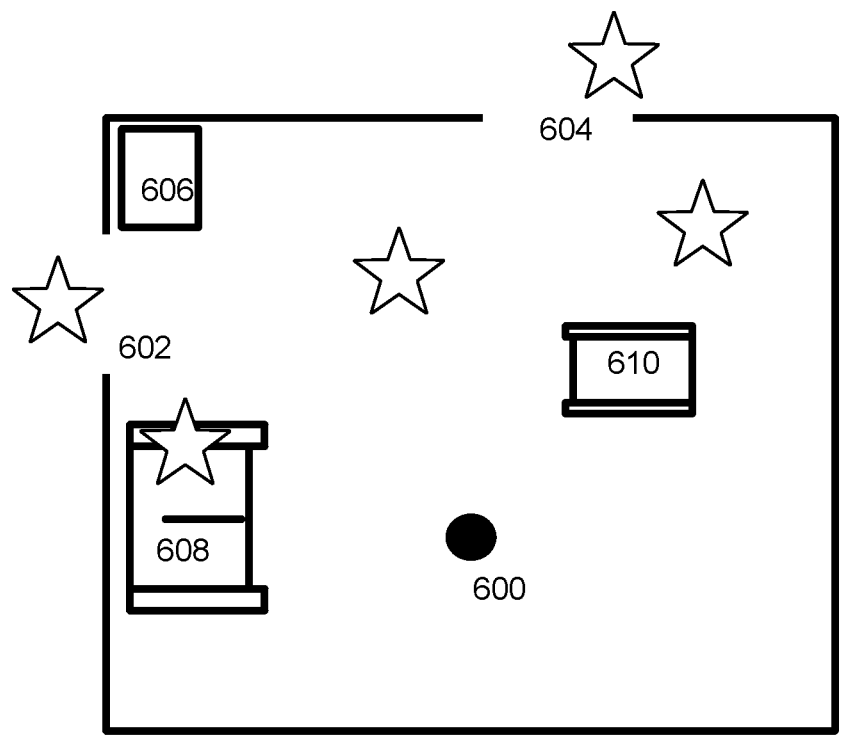
FIG. 9 is a plan view schematically illustrating modified AR content and the digitally reconstructed 3D environment of FIG. 6, in accordance with at least one embodiment.

FIG. 9 is a depiction of a modified AR content and the digitally reconstructed 3D environment of FIG. 6, in accordance with at least one embodiment. The user has requested AR content that depicts nine stars, however the AR content server has modified the AR content and now only five stars are present in the modified data stream.

Figure 10:
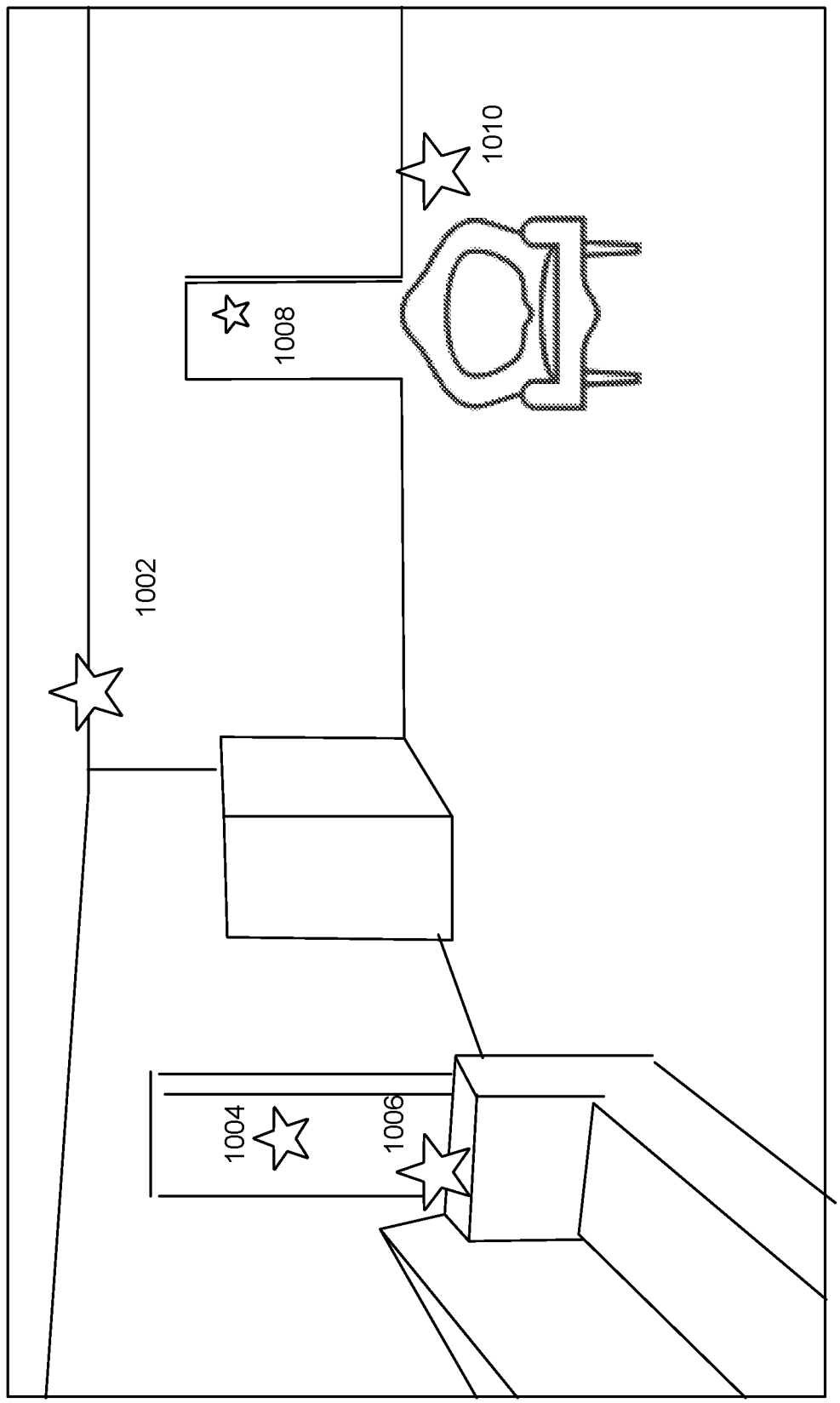
FIG. 10 is a schematic perspective view illustrating the modified AR content of FIG. 9, as seen by the user of FIG. 5, in accordance with at least on embodiment.

FIG. 10 is a depiction of the modified AR content of FIG. 9, as seen by the user of FIG. 5, in accordance with at least on embodiment. FIG. 10 depicts the real-world environment being augmented by the modified AR content. The 5 remaining stars, 1002, 1004, 1006, 1008 and 1010 are all visible. The 4 removed stars, 802, 804, 806 and 808 are not occluded by the walls, chair, etc, but are absent from the data stream altogether.

Exemplary embodiments disclosed herein are implemented using one or more wired and/or wireless network nodes, such as a wireless transmit/receive unit (WTRU) or other network entity.

Figure 11:
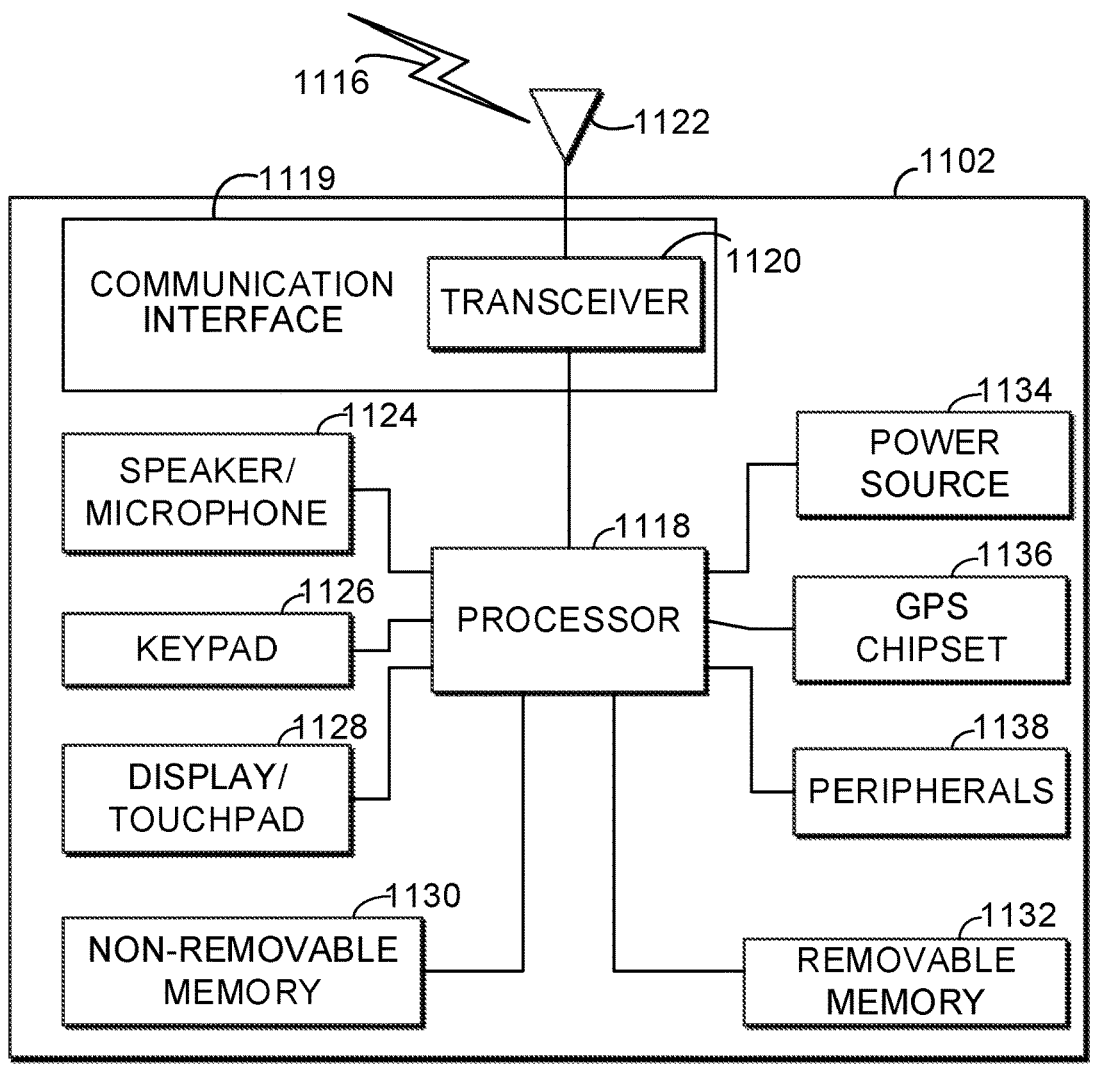
FIG. 11 illustrates an exemplary wireless transmit/receive unit (WTRU) that may be employed as an AR client viewer in some embodiments.

FIG. 11 is a system diagram of an exemplary WTRU 1102, which may be employed as an AR client viewer in embodiments described herein. As shown in FIG. 11, the WTRU 1102 may include a processor 1118, a communication interface 1119 including a transceiver 1120, a transmit/receive element 1122, a speaker/microphone 1124, a keypad 1126, a display/touchpad 1128, a non-removable memory 1130, a removable memory 1132, a power source 1134, a global positioning system (GPS) chipset 1136, and sensors 1138. It will be appreciated that the WTRU 1102 may include any sub-combination of the foregoing elements while remaining consistent with an embodiment.

The processor 1118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1118 may perform signal coding, data processing, power control, input/output processing, and/or any other functionality that enables the WTRU 1102 to operate in a wireless environment. The processor 1118 may be coupled to the transceiver 1120, which may be coupled to the transmit/receive element 1122. While FIG. 11 depicts the processor 1118 and the transceiver 1120 as separate components, it will be appreciated that the processor 1118 and the transceiver 1120 may be integrated together in an electronic package or chip.

The transmit/receive element 1122 may be configured to transmit signals to, or receive signals from, a base station over the air interface 1116. For example, in one embodiment, the transmit/receive element 1122 may be an antenna configured to transmit and/or receive RF signals. In another embodiment, the transmit/receive element 1122 may be an emitter/detector configured to transmit and/or receive IR, UV, or visible light signals, as examples. In yet another embodiment, the transmit/receive element 1122 may be configured to transmit and receive both RF and light signals. It will be appreciated that the transmit/receive element 1122 may be configured to transmit and/or receive any combination of wireless signals.

In addition, although the transmit/receive element 1122 is depicted in FIG. 11 as a single element, the WTRU 1102 may include any number of transmit/receive elements 1122. More specifically, the WTRU 1102 may employ MIMO technology. Thus, in one embodiment, the WTRU 1102 may include two or more transmit/receive elements 1122 (e.g., multiple antennas) for transmitting and receiving wireless signals over the air interface 1116.

The transceiver 1120 may be configured to modulate the signals that are to be transmitted by the transmit/receive element 1122 and to demodulate the signals that are received by the transmit/receive element 1122. As noted above, the WTRU 1102 may have multi-mode capabilities. Thus, the transceiver 1120 may include multiple transceivers for enabling the WTRU 1102 to communicate via multiple RATs, such as UTRA and IEEE 802.11, as examples.

The processor 1118 of the WTRU 1102 may be coupled to, and may receive user input data from, the speaker/microphone 1124, the keypad 1126, and/or the display/touchpad 1128 (e.g., a liquid crystal display (LCD) display unit or organic light-emitting diode (OLED) display unit). The processor 1118 may also output user data to the speaker/microphone 1124, the keypad 1126, and/or the display/touchpad 1128. In addition, the processor 1118 may access information from, and store data in, any type of suitable memory, such as the non-removable memory 1130 and/or the removable memory 1132. The non-removable memory 1130 may include random-access memory (RAM), read-only memory (ROM), a hard disk, or any other type of memory storage device. The removable memory 1132 may include a subscriber identity module (SIM) card, a memory stick, a secure digital (SD) memory card, and the like. In other embodiments, the processor 1118 may access information from, and store data in, memory that is not physically located on the WTRU 1102, such as on a server or a home computer (not shown).

The processor 1118 may receive power from the power source 1134, and may be configured to distribute and/or control the power to the other components in the WTRU 1102. The power source 1134 may be any suitable device for powering the WTRU 1102. As examples, the power source 1134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1118 may also be coupled to the GPS chipset 1136, which may be configured to provide location information (e.g., longitude and latitude) regarding the current location of the WTRU 1102. In addition to, or in lieu of, the information from the GPS chipset 136, the WTRU 1102 may receive location information over the air interface 1116 from a base station and/or determine its location based on the timing of the signals being received from two or more nearby base stations. It will be appreciated that the WTRU 1102 may acquire location information by way of any suitable location-determination method while remaining consistent with an embodiment.

The processor 1118 may further be coupled to other peripherals 1138, which may include one or more software and/or hardware modules that provide additional features, functionality and/or wired or wireless connectivity. For example, the peripherals 1138 may include sensors such as an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 12:
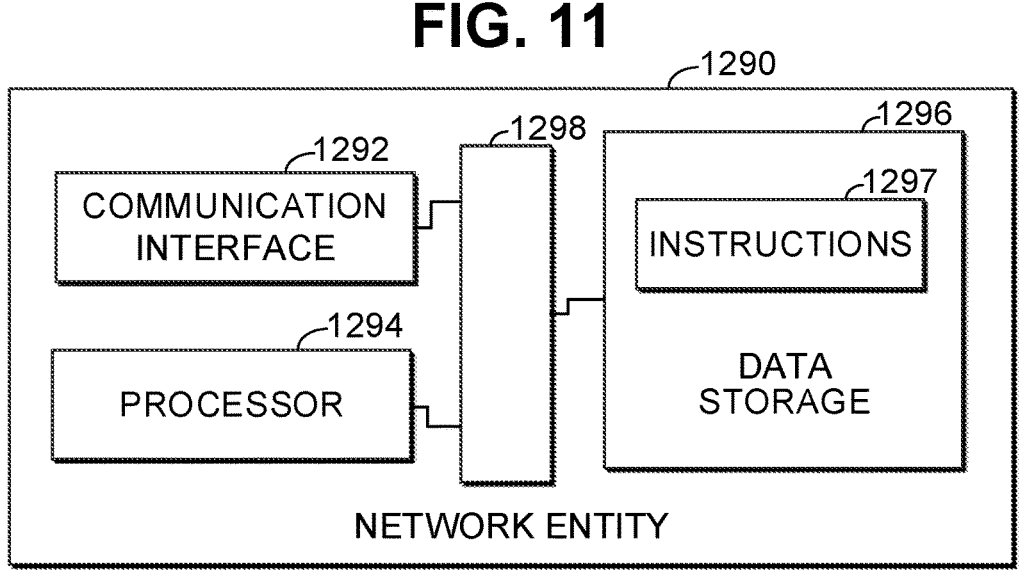
FIG. 12 illustrates an exemplary network entity that may be employed as an AR content server or may be used as AR content storage in some embodiments.

FIG. 12 depicts an exemplary network entity 1290 that may be used in embodiments of the present disclosure, for example as an AR content server or as AR content storage. As depicted in FIG. 12, network entity 1290 includes a communication interface 1292, a processor 1294, and non-transitory data storage 1296, all of which are communicatively linked by a bus, network, or other communication path 1928.

Communication interface 1292 may include one or more wired communication interfaces and/or one or more wireless-communication interfaces. With respect to wired communication, communication interface 1292 may include one or more interfaces such as Ethernet interfaces, as an example. With respect to wireless communication, communication interface 1292 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 1292 may be equipped at a scale and with a configuration appropriate for acting on the network side—as opposed to the client side—of wireless communications (e.g., LTE communications, Wi-Fi communications, and the like). Thus, communication interface 1292 may include the appropriate equipment and circuitry (perhaps including multiple transceivers) for serving multiple mobile stations, UEs, or other access terminals in a coverage area.

Processor 1294 may include one or more processors of any type deemed suitable by those of skill in the relevant art, some examples including a general-purpose microprocessor and a dedicated DSP.

Data storage 1296 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 12, data storage 1296 contains program instructions 1297 executable by processor 1294 for carrying out various combinations of the various network-entity functions described herein.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Accordingly, some embodiments of the present disclosure, or portions thereof, may combine one or more processing devices with one or more software components (e.g., program code, firmware, resident software, micro-code, etc.) stored in a tangible computer-readable memory device, which in combination form a specifically configured apparatus that performs the functions as described herein. These combinations that form specially programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that separate processor devices and/or computing hardware platforms perform the described functions.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An augmented reality (AR) content server comprising:
    a processor;
    a communication interface; and
    non-transitory data storage;
    the AR content server configured to:
        receive a request for AR content via the communication interface;
        obtain, from the non-transitory data storage, the requested AR content;
        obtain a digitally reconstructed three-dimensional (3D) environment of an AR viewing location;
        receive via the communication interface a point-of-view position and an orientation from within the AR viewing location including information indicating a depth and a geometry of a real-world object occluding visibility;
        perform a visibility analysis via a comparison of the requested AR content with the digitally reconstructed 3D environment and the point-of-view position and the orientation, wherein the visibility analysis includes identifying where the digitally reconstructed 3D environment has smaller depth values than depth data associated with the requested AR content; and
        modify the requested AR content by removing data associated with one or more objects not visible from the point-of-view position and the orientation according to the visibility analysis.

2. The AR content server of claim 1, wherein the digitally reconstructed 3D environment is obtained from one or more of:
   the non-transitory data storage;
   an AR client; or
   a combination of the non-transitory data storage and the AR client.

3. The AR content server of claim 1, wherein the modification of the requested AR content is a function of a content type of the requested AR content, the content type including one or more of:
   a 3D scene;
   a light field; or
   immersive video with depth data.

4. The AR content server of claim 1, wherein the modification of the requested AR content includes:
   an insert of previously removed 3D objects within the requested AR content based on an updated point-of-view position and an updated orientation.

5. A method comprising:
   receiving a request for an augmented reality (AR) content video stream;
   obtaining, from a data storage, the requested AR content video stream;
   obtaining a digitally reconstructed three-dimensional (3D) environment of a real-world AR viewing location;
   receiving a point-of-view position and an orientation from an AR client in the real-world AR viewing location including information indicating a depth and a geometry of a real-world object occluding visibility;
   analyzing the digitally reconstructed 3D environment and the point-of-view position and the orientation to determine whether the requested AR content video stream includes one or more AR objects occluded in the digitally reconstructed 3D environment, wherein the analyzing includes comparing depth values of the digitally reconstructed 3D environment with depth values in the requested AR content video stream; and
   removing the one or more AR objects that are occluded in the digitally reconstructed 3D environment.

6. The method of claim 5 further comprising:
   sending the requested AR content video stream to the AR client after removing the occluded AR objects from the requested AR content video stream.

7. The method of claim 6 wherein the analyzing the digitally reconstructed 3D environment and the point-of-view position and the orientation includes:
   determining a location of an AR display device associated with the AR client;
   identifying one or more physical objects in the digitally reconstructed 3D environment as along a line of sight determined from the point-of-view position and the orientation of the AR display device; and
   determining whether the one or more AR objects in the requested AR content video stream are occluded by the one or more physical objects based on the line of sight.

8. The method of claim 6 wherein the analyzing the digitally reconstructed 3D environment and the point-of-view position and the orientation further includes:
   discarding portions of the requested AR content video stream with larger depth values than corresponding depth values in the digitally reconstructed 3D environment.

9. A method comprising:
   receiving, from an augmented reality (AR) client, information indicating depth values of real-world objects in an AR viewing location;
   comparing the information indicating the depth values of the real-world objects with depth values in an AR content stream to identify one or more occluded portions of the AR content stream;
   modifying the AR content stream to remove the one or more occluded portions; and
   sending the AR content stream to the AR client after removing the one or more occluded portions from the AR content stream.

10. The method of claim 9, wherein modifying the AR content stream to remove the one or more occluded portions comprises discarding portions of the AR content stream with larger depth values than the depth values of the real-world objects.

11. The method of claim 9, wherein the AR content stream comprises a 3D scene.

12. The method of claim 9, wherein the AR content stream comprises a light field.

13. The method of claim 9, wherein the AR content stream comprises immersive video with depth data.

* * * * *